(12) United States Patent
Liu et al.

(10) Patent No.: US 9,500,771 B2
(45) Date of Patent: *Nov. 22, 2016

(54) METAMATERIAL FOR CONVERGING ELECTROMAGNETIC WAVES

(75) Inventors: Ruopeng Liu, Guangdong (CN); Chunlin Ji, Guangdong (CN); Jinjin Wang, Guangdong (CN)

(73) Assignees: KUANG-CHI INNOVATIVE TECHNOLOGY LTD., Shenzhen, Guangdong (CN);
(Continued)

( * ) Notice: Subject to any disclaimer, the term of this patent is extended or adjusted under 35 U.S.C. 154(b) by 555 days.

This patent is subject to a terminal disclaimer.

(21) Appl. No.: 13/522,706

(22) PCT Filed: Nov. 17, 2011

(86) PCT No.: PCT/CN2011/082386
§ 371 (c)(1),
(2), (4) Date: Jul. 17, 2012

(87) PCT Pub. No.: WO2012/139378
PCT Pub. Date: Oct. 18, 2012

(65) Prior Publication Data
US 2013/0016030 A1    Jan. 17, 2013

(30) Foreign Application Priority Data

Apr. 14, 2011  (CN) .......................... 2011 1 0093910

(51) Int. Cl.
*H01Q 15/00*   (2006.01)
*G02B 1/00*    (2006.01)
(Continued)

(52) U.S. Cl.
CPC .......... *G02B 1/002* (2013.01); *H01Q 15/0086* (2013.01); *H01Q 15/02* (2013.01); *H01Q 19/062* (2013.01)

(58) Field of Classification Search
CPC ................ H01Q 15/02; H01Q 15/0086; H01Q 19/062; H01P 3/00; G02B 3/0087
(Continued)

(56) References Cited

U.S. PATENT DOCUMENTS

| 2009/0201572 A1* | 8/2009 | Yonak ........................... 359/316 |
| 2010/0225562 A1* | 9/2010 | Smith ............................ 343/909 |
| 2011/0069377 A1* | 3/2011 | Wu et al. ....................... 359/356 |

OTHER PUBLICATIONS

Nantakan Wongkasem et al., Development of Chiral Negative Refractive Index Metamaterials for the Terahertz Frequency Regime, Nov. 2007, pp. 3052-3062, vol. 55, No. 11, XP011196928, IEEE Transactions on Antennas and Propagation.
(Continued)

*Primary Examiner* — Bumsuk Won
*Assistant Examiner* — Wen Huang
(74) *Attorney, Agent, or Firm* — Winston Hsu; Scott Margo (57) ABSTRACT

The present disclosure relates to a metamaterial for converging electromagnetic waves, which comprises a plurality of cubic metamaterial units arranged in a first array which takes a y direction as a column direction and a z direction perpendicular to the y direction as a row direction. The metamaterial units of each row have the same refractive index, and for the metamaterial units of each column, the refractive indices thereof for the electromagnetic waves decrease gradually from a middle metamaterial unit towards two ends of the column, with variations of the refractive indices between adjacent ones of the metamaterial units increasing gradually from the middle metamaterial unit towards the two ends of the column; and the metamaterial units are anisotropic to the electromagnetic waves. The metamaterial for converging electromagnetic waves of the present disclosure can achieve the function of converging
(Continued)

electromagnetic waves, and has a smaller thickness compared to conventional metamaterials.

16 Claims, 7 Drawing Sheets

(73) Assignees: KUANG-CHI INSTITUTE OF ADVANCED TECHNOLOGY, Shenzhen, Guangdong (CN)

(51) Int. Cl.
*H01Q 15/02* (2006.01)
*H01Q 19/06* (2006.01)

(58) Field of Classification Search
USPC .......................................... 359/652–654, 724
See application file for complete search history.

(56) References Cited

OTHER PUBLICATIONS

N. I. Zheludev et al., Metamaterial polarization spectral filter: Isolated transmission line at any prescribed wavelength, Oct. 28, 2011, pp. 171915-1-171915-3, XP012153263, American Institute of Physics, Applied Physics Letters 99.

* cited by examiner

METAMATERIAL FOR CONVERGING ELECTROMAGNETIC WAVES

FIELD OF THE INVENTION

The present disclosure generally relates to the technical field of electromagnetic communications, and more particularly, to a metamaterial for converging electromagnetic waves.

BACKGROUND OF THE INVENTION

As a new kind of material, a metamaterial is formed by a substrate made of a non-metallic material and a plurality of man-made microstructures attached on a surface of the substrate or embedded inside the substrate. The substrate may be virtually divided into a plurality of cubic substrate units arranged in a rectangular array shape, with each of the substrate units being attached with one man-made microstructure to form one metamaterial unit. Correspondingly, just like a crystal which is formed by numerous crystal lattices arranged in a certain manner, the whole metamaterial consists of hundreds of or millions of or even hundreds of millions of such metamaterial units. The man-made microstructures may either be the same or not be totally the same for each of the metamaterial units. Each of the man-made microstructures is a cylindrical or flat metal wire that forms a certain geometrical pattern, for example, a metal wire that forms a circular shape, an "l" shape or the like.

Due to presence of the man-made microstructures, each of the metamaterial units presents an equivalent dielectric constant and an equivalent magnetic permeability that are different from those of the substrate. Therefore, the metamaterial comprised of all the metamaterial units exhibits special response characteristics to the electric field and the magnetic field. Meanwhile, by designing the man-made microstructures into different structures and shapes, the equivalent dielectric constant and the equivalent magnetic permeability of the metamaterial units and, consequently, the response characteristics of the whole metamaterial can be changed.

Accordingly, there is a need in the art to provide a metamaterial that can gather planar electromagnetic waves or even converge them to a point just like a lens which converges parallel light rays to a single point. Unfortunately, this need has not been satisfied in the art.

SUMMARY OF THE INVENTION

An objective of the present disclosure is to provide a metamaterial for converging electromagnetic waves, which comprises a plurality of cubic metamaterial units arranged in a first array which takes a y direction as a column direction and a z direction perpendicular to the y direction as a row direction. The metamaterial units of each row have the same refractive index, and for the metamaterial units of each column, the refractive indices thereof for the electromagnetic waves decrease gradually from a middle metamaterial unit towards two ends of the column, with variations of the refractive indices between adjacent ones of the metamaterial units increasing gradually from the middle metamaterial unit towards the two ends of the column; and the metamaterial units are anisotropic to the electromagnetic waves.

Preferably, the metamaterial units all have the same volume.

Preferably, the refractive indices of the metamaterial units of each column are $b_1, b_2, b_3, \ldots, b_q, b_{q+1}, b_{q+2}, \ldots, b_m$ in sequence, where q is a natural number greater than 1, m is a natural number greater than 2, the metamaterial unit that has the refractive index $b_q$ is the middle metamaterial unit, and the refractive indices satisfy:

$$(b_2-b_1) \geq (b_3-b_2) \ldots \geq (b_q-1-b_q);$$

$$(b_q+1-b_q+2) \leq (b_q+2-b_q+3) \ldots \leq (b_m-1-b_m).$$

Preferably, the refractive indices of each column of the metamaterial units are distributed in symmetry as follows:
when m is an odd number, the refractive indices satisfy $q=(m+1)/2$, $b_1=b_m$, $b_2=b_m-1$, ..., $b_q-1=b_q+1$; and
when m is an even number, the refractive indices satisfy $q=m/2$, $b_1=b_m$, $b_2=b_m-1$, ..., $b_q=b_q+1$.

Preferably, each of the metamaterial units comprises a cubic substrate unit and a man-made microstructure disposed in the substrate unit, and the substrate unit is the same for each of the metamaterial units.

Preferably, the metamaterial units of each row have the same man-made microstructures and thus have the same refractive indices; and for each column of the metamaterial units, the man-made microstructures thereof decrease gradually from the middle metamaterial unit towards two ends of the column so that the refractive indices of the metamaterial units decrease gradually.

Preferably, dimensions of each of the metamaterial units in an x direction, the y direction and the z direction range between one fiftieth and a half of the wavelength of the electromagnetic waves.

Preferably, the man-made microstructures of the metamaterial units are non-90° rotationally symmetrical structures, so the metamaterial units are anisotropic to the electromagnetic waves.

Preferably, the man-made microstructures of each column in the y direction are rotated clockwise or counterclockwise in sequence respectively from the middle metamaterial unit towards two ends of the column, and the man-made microstructures of the metamaterial units located at the two ends are rotated by no more than 90° with respect to the man-made microstructure of the middle metamaterial unit.

Preferably, clockwise rotation angles of the man-made microstructures of each column in the y direction are $\theta_1, \theta_2, \theta_3, \ldots, \theta_q$ in sequence, and have the following relationships therebetween:

$$\theta_1 \leq \theta_2 \leq \theta_3 \leq \ldots \leq \theta_q.$$

Preferably, each of the man-made microstructures is a metal wire of an "l" shape, a metal wire of a two-dimensional (2D) snowflake shape or a metal wire of a three-dimensional (3D) snowflake shape.

Preferably, the metamaterial comprises a plurality of metamaterial units arranged in arrays in planes formed by any two of the x direction, the y direction and the z direction perpendicular to each other.

Preferably, the metamaterial units of each stacked sequence arranged in the x direction have equal refractive indices.

Preferably, for the metamaterial units of each stacked sequence arranged in the x direction, the refractive indices thereof also decrease gradually from another middle metamaterial unit towards two ends of the stacked sequence and variations of the refractive indices between adjacent ones of the metamaterial units increase gradually from the another middle metamaterial unit towards the two ends of the stacked sequence.

Preferably, a second array is formed by taking the x direction as a row direction and the y direction perpendicular to the x direction as a column direction, and the refractive indices of the second array are distributed in a circular shape.

In the metamaterial for converging electromagnetic waves of the present disclosure, each of the metamaterial units comprises a cubic substrate unit and a man-made microstructure attached on the substrate unit, and the substrate unit is the same for each of the metamaterial units.

In the metamaterial for converging electromagnetic waves of the present disclosure, the metamaterial units of each row have the same man-made microstructures and thus have the same refractive indices; and for each column of the metamaterial units, the man-made microstructures thereof decrease gradually from the middle metamaterial unit towards two ends of the column so that the refractive indices of the metamaterial units decrease gradually.

In the metamaterial for converging electromagnetic waves of the present disclosure, the metamaterial comprises a plurality of metamaterial units arranged in arrays in planes formed by any two of the x direction, the y direction and the z direction perpendicular to each other.

In the metamaterial for converging electromagnetic waves of the present disclosure, the metamaterial units of each stacked sequence arranged in the x direction have equal refractive indices.

In the metamaterial for converging electromagnetic waves of the present disclosure, for the metamaterial units of each stacked sequence arranged in the x direction, the refractive indices thereof also decrease gradually from another middle metamaterial unit towards two ends of the stacked sequence and variations of the refractive indices between adjacent ones of the metamaterial units increase gradually from the another middle metamaterial unit towards the two ends of the stacked sequence.

In the metamaterial for converging electromagnetic waves of the present disclosure, the man-made microstructures of the metamaterial units are non-90° rotationally symmetrical structures, so the metamaterial units are anisotropic to the electromagnetic waves.

In the metamaterial for converging electromagnetic waves of the present disclosure, the man-made microstructures of each column are rotated clockwise or counterclockwise in sequence respectively from the middle metamaterial unit towards two ends of the column, and the man-made microstructures of the metamaterial units located at the two ends are rotated by no more than 90° with respect to the man-made microstructure of the middle metamaterial unit.

The metamaterial for converging electromagnetic waves of the present disclosure has the following benefits: it can achieve the function of converging electromagnetic waves, and has a smaller thickness as compared to conventional metamaterials for converging electromagnetic waves.

BRIEF DESCRIPTION OF THE DRAWINGS

Hereinbelow, the present disclosure will be further described with reference to the attached drawings and embodiments thereof. In the attached drawings.

DETAILED DESCRIPTION OF THE INVENTION

Figure 1:
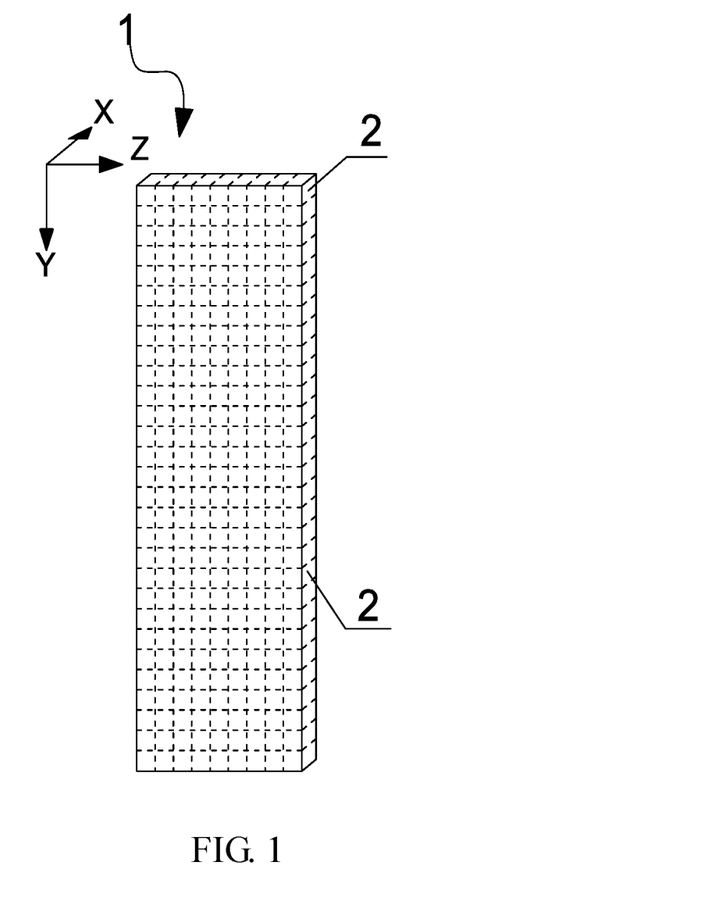
FIG. 1 is a schematic structural view of each metamaterial sheet layer formed by metamaterial units arranged in an array in a y direction and a z direction.
Figure 4:
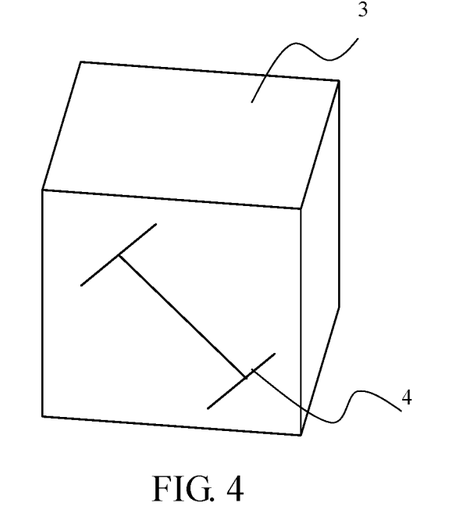
FIG. 4 is a schematic structural view of a first embodiment of a man-made microstructure.
Figure 5:
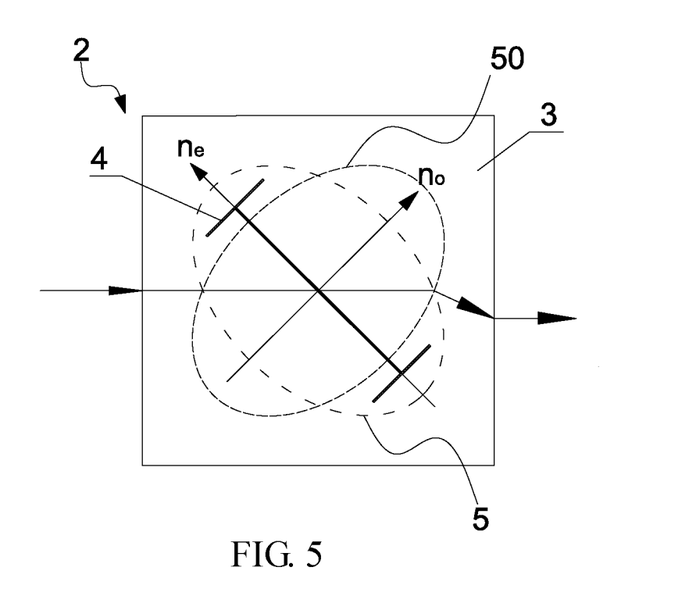
FIG. 5 is a schematic view illustrating a direction in which the electromagnetic waves propagate in the metamaterial unit shown in FIG. 4.

The present disclosure relates to a metamaterial for converging electromagnetic waves, which comprises a plurality of metamaterial sheet layers. As shown in FIG. 1, FIG. 4 and FIG. 5, each of the metamaterial sheet layers 1 has a front surface and a back surface parallel to each other, and thus has a uniform thickness. In the metamaterial sheet layer 1, the thickness direction is defined as an x direction, the length direction is defined as a y direction, and the width direction is defined as a z direction. The x direction, the y direction and the z direction are perpendicular to each other.

The metamaterial sheet layer 1 comprises a sheet substrate 3 that is uniform in thickness and a plurality of man-made microstructures 4 attached on the sheet substrate 3. The sheet substrate 3 is virtually divided into a plurality of identical cubic substrate units, and each of the substrate units is attached with one man-made microstructure 4. Then, each of the substrate units and the man-made microstructure 4 attached thereon jointly form one metamaterial unit 2. The whole metamaterial sheet layer 1 may be viewed as a first array formed by a plurality of metamaterial units 2 which takes the z direction as a row direction and the y direction as a column direction. The cubic substrate units may have dimensions that are divided arbitrarily; and preferably in the present disclosure, both lengths in the y direction and the z direction are one tenth of the wavelength of the electromagnetic waves to be converged, and the length in the x direction is equal to a thickness of the sheet substrate 3 in the x direction. Of course, for each of the metamaterial units of the present disclosure, the lengths in the x direction, the y direction and the z direction may be any value that is between one fiftieth and a half of the wavelength of the electromagnetic waves.

Figure 6:
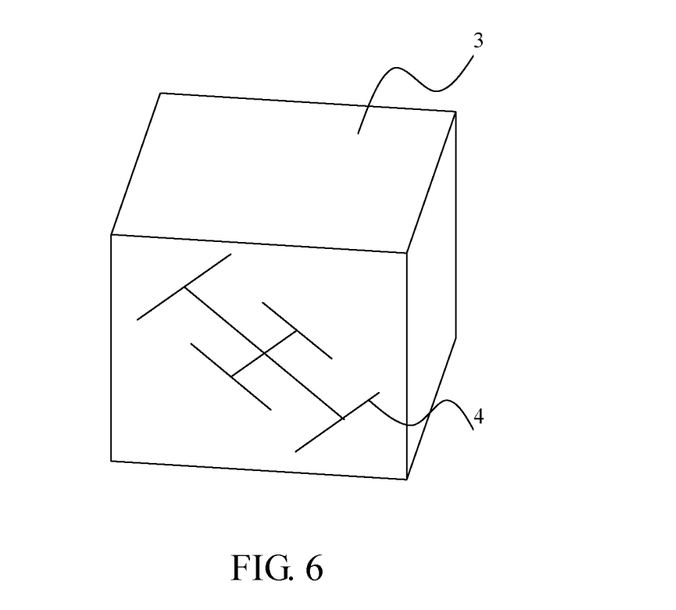
FIG. 6 is a schematic structural view of a second embodiment of the man-made microstructure.
Figure 7:
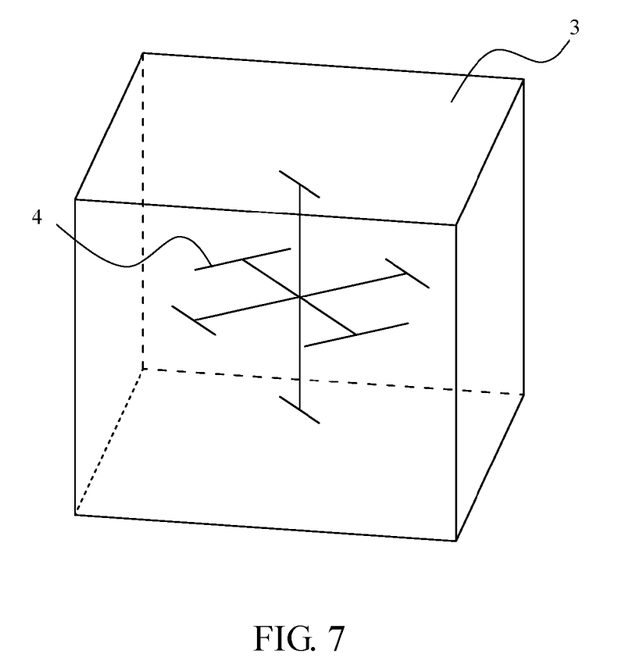
FIG. 7 is a schematic structural view of a third embodiment of the man-made microstructure.

The structure of the metamaterial unit 2 is as shown in FIG. 4, FIG. 6 and FIG. 7. In the metamaterial unit 2 shown in FIG. 4, the man-made microstructure 4 is a planar metal wire of an "I" shape, which comprises a linear first metal wire and two second metal wires that are perpendicularly connected at two ends of the first metal wire respectively. The man-made microstructure 4 shown in FIG. 6 is of a two-dimensional (2D) snowflake shape, comprising two first metal wires that perpendicularly intersect with each other in a "+" shape and four second metal wires that are perpendicularly connected at two ends of each of the first metal wires respectively. The man-made microstructure 4 shown in FIG. 7 is of a three-dimensional (3D) snowflake shape, comprising three first metal wires that perpendicularly intersect with each other at a common intersection point and six second metal wires that are perpendicularly connected at two ends of each of the first metal wires respectively. The 3D man-made microstructure 4 is attached into the substrate 3 through a certain manufacturing process.

Of course, the man-made microstructure 4 of the present disclosure may further be implemented in many shapes. Specifically, any structure that is formed by metal wires or metal lines into a certain geometrical pattern and that can change its electromagnetic properties in response to an electromagnetic field can be used as the man-made microstructure 4 of the present disclosure to be attached on a surface of the substrate 3 or embedded inside the substrate 3 to form the metamaterial unit 2 of the present disclosure.

Metamaterial units 2 having different man-made microstructures 4 exhibit different dielectric constants and different magnetic permeabilities, and thus make different electromagnetic responses to the electromagnetic waves. An important response is to change the propagating direction of the electromagnetic waves. According to the metamaterial for converging electromagnetic waves of the present disclosure, the amount of variation in the propagating direction of the electromagnetic waves propagating through each of the metamaterial units 2 can be set through design of the dielectric constant and the magnetic permeability of each of the metamaterial units 2. Then, all of the metamaterial units 2 can act together to converge all the electromagnetic waves towards one direction or even converge them to a point. The refractive index can be used to represent the variation in the propagating direction of the electromagnetic waves.

In order to achieve the converging function for the metamaterial for converging electromagnetic waves of the present disclosure, two preconditions shall be satisfied.

I) The refractive index distribution is non-uniform.

Figure 2:
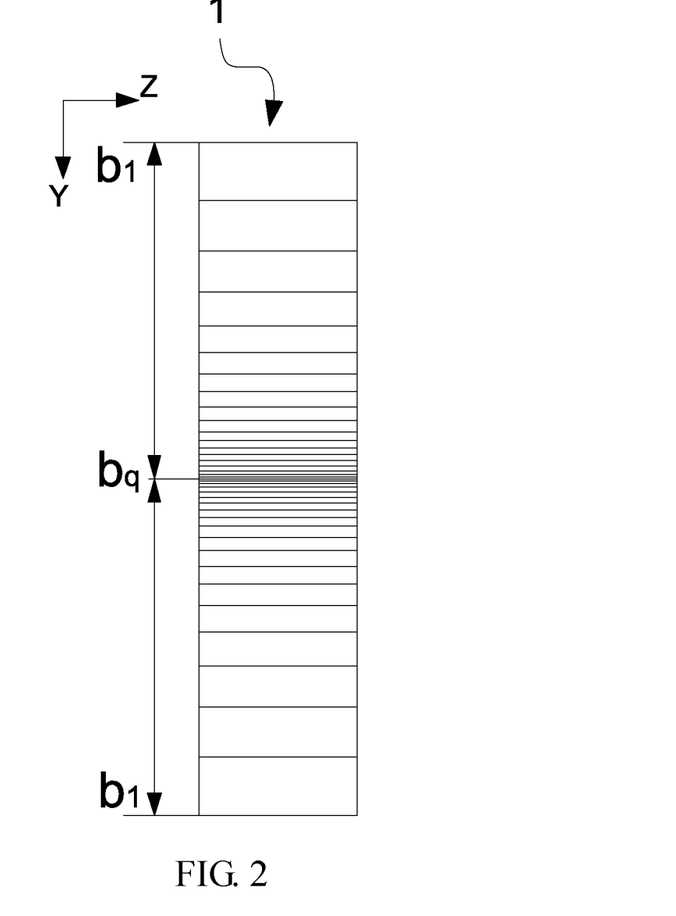
FIG. 2 is a schematic view illustrating a refractive index distribution of the metamaterial sheet layer shown in FIG. 1.

FIG. 2 illustrates a refractive index distribution of each metamaterial sheet layer 1. The metamaterial units of each row in the z direction have equal refractive indices. The refractive indices of a column of metamaterial units 2 in the y direction are $b_1, b_2, b_3, \ldots, b_q, b_{q+1}, b_{q+2}, \ldots, b_m$ in sequence, and satisfy:

$$b_1 \leq b_2 \leq b_3 \ldots \leq b_q \quad (1)$$

$$b_{q+1} \geq b_{q+2} \geq b_{q+3} \ldots \geq b_m \quad (2)$$

where q is a natural number greater than 1, m is a natural number greater than 2, and q is smaller than m.

A portion of the metamaterial where the refractive indices are $b_1$ to $b_q$ is defined as a first metamaterial section 200, and a portion of the metamaterial where the refractive indices are $b_q$ to $b_m$ is defined as a second metamaterial section 300.

When terms in each of the relational expressions (1) and (2) are not equal to each other simultaneously (i.e., when the refractive indices of the first metamaterial section 200 and the second metamaterial section 300 are distributed non-uniformly), the phase propagating direction of the electromagnetic waves will be deflected towards a direction where the refractive index is large. Therefore, an electromagnetic wave incident from the first metamaterial section 200 will be deflected towards the metamaterial units 2 having the refractive index of $b_q$ when exiting from the metamaterial; and an electromagnetic wave propagating through the second metamaterial section 300 will also be deflected towards the metamaterial units 2 having the refractive index of $b_q$ when exiting from the metamaterial. That is, electromagnetic waves incident from two sides of a row of middle metamaterial units will be converged towards the row of middle metamaterial units when exiting from the metamaterial.

Further, in order to converge the electromagnetic waves to a point, the electromagnetic wave incident from a site near the metamaterial units 2 having the refractive index of $b_1$ must be deflected at a relatively large angle with respect to the incident direction when exiting, and the electromagnetic wave incident from a site near the metamaterial units having the refractive index of $b_q$ must be deflected at a relatively small angle or even be not deflected when exiting.

As is already known, the larger the variation in refractive index between the metamaterial units 2 of two adjacent rows is, the larger the deflection angle of the electromagnetic waves will be. Therefore, in order to converge all the electromagnetic waves to a point, the refractive indices of the metamaterial units of each column in the y direction also have the following relationships therebetween:

$$(b_2-b_1) \geq (b_3-b_2) \ldots \geq (b_q-1-b_q) \quad (3)$$

$$(b_q+1-b_q+2) \leq (b_q+2-b_q+3) \ldots \leq (b_m-1-b_m) \quad (4)$$

Obviously, terms in each of the relational expressions (3) and (4) are not equal to each other simultaneously.

For the metamaterial satisfying the aforesaid refractive index variation relationship, the refractive index variations at two sides of the middle metamaterial units 2 having the refractive index of $b_q$ increase gradually towards two ends for electromagnetic waves that are incident in parallel. Therefore, taking the metamaterial units 2 having the refractive index of $b_q$ as a boundary, electromagnetic waves that are incident closer to the two ends will have larger deflection angles when exiting, and electromagnetic waves that are incident closer to the metamaterial units 2 having the refractive index of $b_q$ will have smaller deflection angles when exiting.

Figure 3:
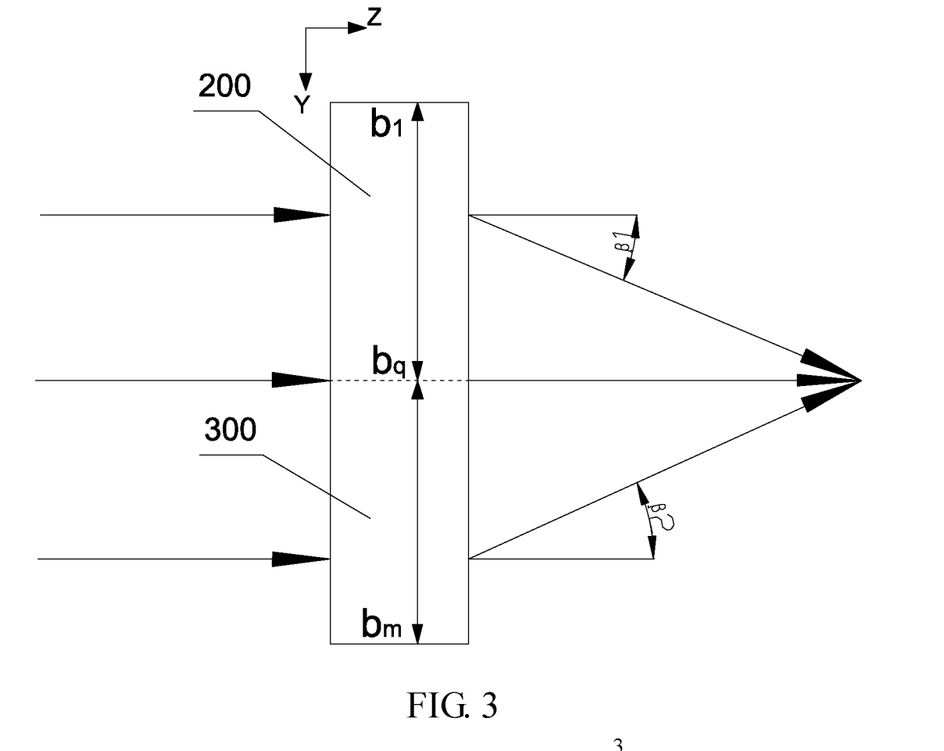
FIG. 3 is a schematic view illustrating how the metamaterial sheet layer shown in FIG. 2 converges electromagnetic waves.

For example, three electromagnetic waves shown in FIG. 3 are projected on the first metamaterial section, the row of middle metamaterial units and the second metamaterial section of the metamaterial sheet layer 1 respectively all parallel to the z direction. In order to have the electromagnetic waves deflected and converged to a point after propagating through the metamaterial sheet layer 1, deflection angles $\beta 1$, 0, $\beta 2$ of the electromagnetic waves with respect to the z direction when exiting may be calculated. According to tests and simulation, it can be known that the refractive index variation $\Delta n$ and the deflection angle $\beta$ (e.g., $\beta 1$ or $\beta 2$) have the following relationships therebetween:

$$d \cdot \Delta n = \sin \beta \quad (5)$$

where d represents the length of the metamaterial sheet layer 1 in the z direction, and $\Delta n$ represents a difference in refractive index between the metamaterial units of two adjacent rows. With d and $\sin \beta$ being known, $\Delta n$ can be solved. By setting a refractive index base, the refractive indices of the metamaterial units of the two adjacent rows can be derived reversely. After the deflection angles at all sites are calculated, the refractive index distribution of the metamaterial sheet layer 1 in the y direction can be derived finally. After a man-made microstructure 4 is designed, the dielectric constant and the magnetic permeability thereof are obtained through calculation and simulation, and then, the shape and the dimensions of the man-made microstructure 4 are adjusted continuously until the dielectric constant and the magnetic permeability thereof satisfy the aforesaid refractive index distribution.

Further, in order to simplify the design and manufacturing processes, the first metamaterial section 200 and the second metamaterial section 300 of the present disclosure are completely symmetrical in structure. Then, the refractive index distribution will also be symmetrical, that is:

1) when m is an odd number, the refractive indices of the first metamaterial section 200 and the second metamaterial section 300 satisfy:

$$q=(m+1)/2, b_1=b_m, b_2=b_m-1, \ldots, b_q-1=b_q+1 \quad (6)$$

2) when m is an even number, the refractive indices of the first metamaterial section 200 and the second metamaterial section 300 satisfy:

$$q=m/2, b_1=b_m, b_2=b_m-1, \ldots, b_q=b_q+1 \quad (7)$$

The aforesaid relational expressions between q and m may also be represented as $q=[(m+1)/2]$, and $[(m+1)/2]$ represents an integer portion of a result of dividing m by 2.

The metamaterial units of the metamaterial sheet layer 1 that have a same refractive index are connected by a line, and the magnitudes of the refractive indices are represented by the density of the lines. A smaller density of the lines represents a larger refractive index, and a larger density variation represents a larger variation rate of the refractive indices. Then, the metamaterial sheet layer satisfying the formulas (1) to (6) or (7) has the refractive index distribution as shown in FIG. 2.

Figure 8:
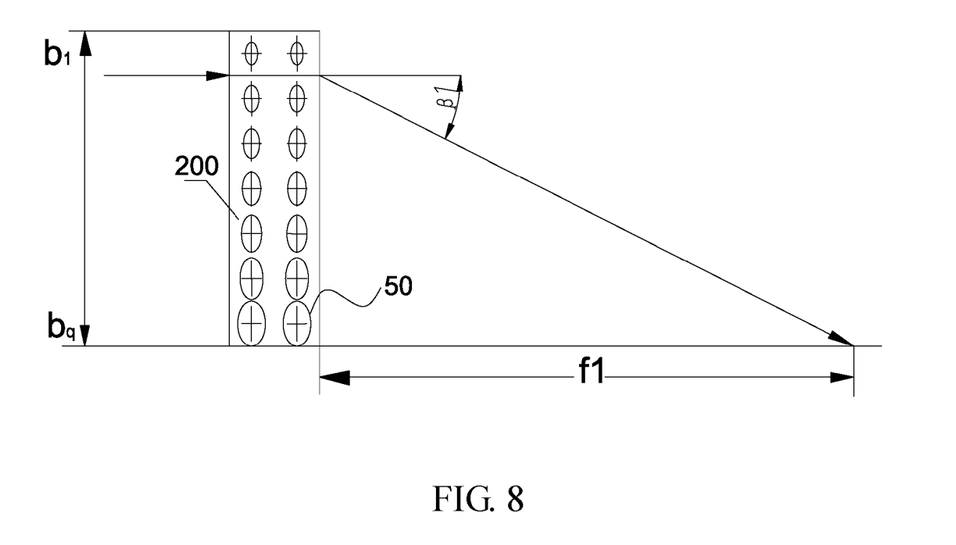
FIG. 8 is a schematic view illustrating propagation of the electromagnetic waves when major axes of electromagnetic wave propagating ellipsoids are parallel to the y direction.
Figure 9:
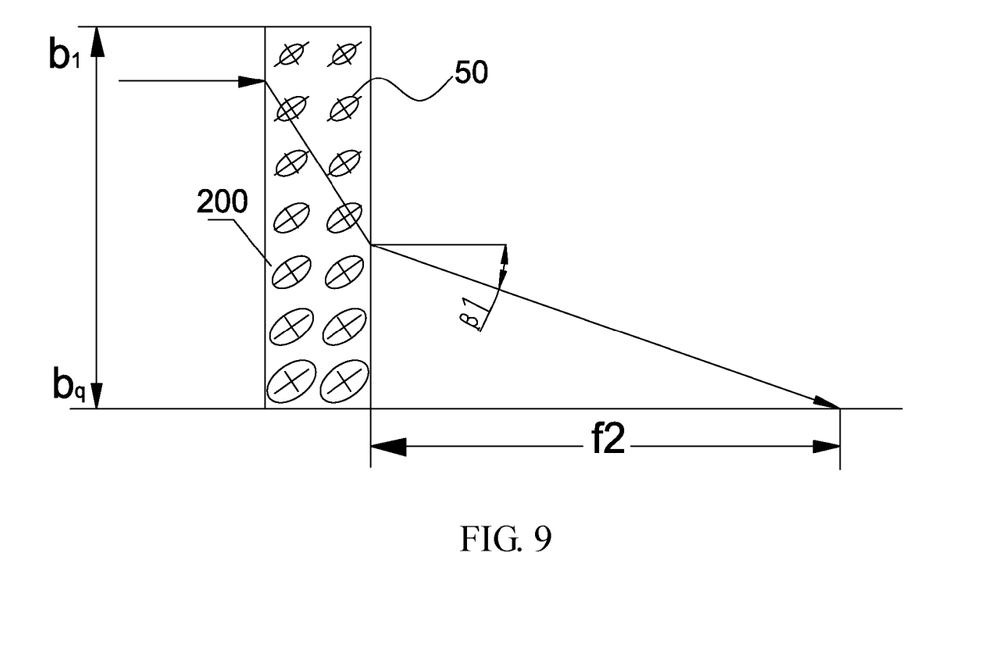
FIG. 9 is a schematic view illustrating propagation of the electromagnetic waves when the major axes of the electromagnetic wave propagating ellipsoids are all oblique at a certain angle with respect to the y direction.
Figure 10:
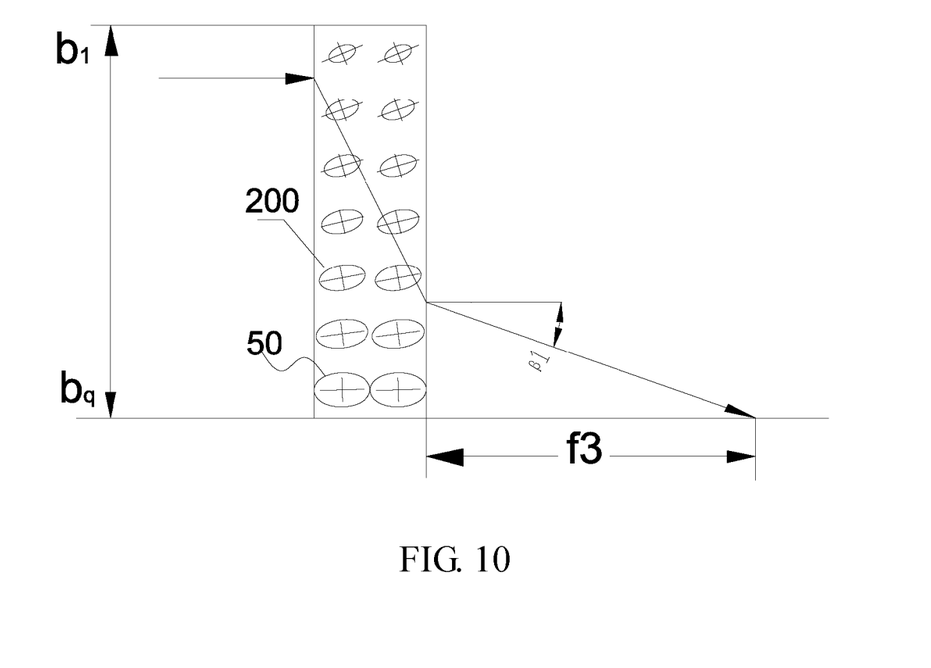
FIG. 10 is a schematic view illustrating propagation of the electromagnetic waves when the major axes of the electromagnetic wave propagating ellipsoids of the man-made microstructures in the y direction are gradually rotated incrementally.

In this case, when m is an odd number, a plane that passes through a center line of a row of metamaterial units having the refractive index of $a_q$ and that is perpendicular to the surface of the metamaterial is taken as a symmetry plane; and when m is an even number, an interface between two rows of metamaterial units having the refractive indices of $a_q$ and $a_{q+1}$ respectively is taken as a symmetry plane. For simplicity of description, only the first metamaterial section 200 will be described and depicted hereinbelow, as shown in FIG. 8 to FIG. 10.

II) The metamaterial units are anisotropic to the electromagnetic waves.

Making the metamaterial units anisotropic to the electromagnetic waves can allow the energy propagating direction to be deflected when the electromagnetic waves propagate through the metamaterial units.

In order to make each of the metamaterial sections isotropic, the metamaterial units 2 within the metamaterial section must be isotropic. Further, the man-made microstructures 4 within the metamaterial section are required to be isotropic. If each of the man-made microstructures 4 is a 90° rotationally symmetrical structure, then the corresponding metamaterial unit 2 exhibits the isotropic property to the electromagnetic waves.

For a 2D structure, "90° rotationally symmetrical" means that the 2D structure will coincide with the original structure after being arbitrarily rotated by 90° about a rotation axis perpendicular to the plane. For a 3D structure, if there are three rotation axes that are perpendicular to each other at a common intersection point so that the structure will coincide with the original structure or be symmetrical with the original structure with respect to an interface after being rotated by 90° about any of the rotation axes, then the structure is a 90° rotationally symmetrical structure. Therefore, in order to achieve the anisotropy, each of the man-made microstructures 4 of the present disclosure shall not be a 90° rotationally symmetrical structure, but can only be a non-90° rotationally symmetrical structure.

For example, the man-made microstructure 4 of the embodiment shown in FIG. 4 is a non-90° rotationally symmetrical structure, and the corresponding metamaterial unit 2 is anisotropic. For the man-made microstructure 4 of the embodiment shown in FIG. 6, if the two first metal wires are identical to and perpendicularly bisect each other and all of the second metal wires are identical to each other and are perpendicularly bisected by the respective first metal wires connected thereto, then such a man-made microstructure 4 of a 2D snowflake shape is isotropic. Similarly as shown in FIG. 7, if the three first metal wires are identical to and perpendicularly bisect each other and all of the second metal wires are identical to each other and are perpendicularly bisected by the respective first metal wires connected thereto, then such a structure of a 3D snowflake shape is also isotropic. All the man-made microstructures of the present disclosure are anisotropic.

The anisotropic material can deflect the incident electromagnetic wave when the electromagnetic wave is not perpendicular to the optical axis thereof. The optical axis of the anisotropic metamaterial of the present disclosure is parallel to the extraordinary light optical axis of a refractive index ellipsoid of each of the metamaterial units. The refractive index ellipsoid 5 is used to represent the refractive index properties, and the size of the refractive index ellipsoid 5 represents the magnitude of the refractive index.

For any given metamaterial unit 2, the refractive index ellipsoid 5 thereof can be calculated through the simulation software and the calculation method of the prior art, for example, as described in *Electromagnetic parameter retrieval from inhomogeneous metamaterials* (D. R. Smith, D. C. Vier, T. Koschny, C. M. Soukoulis, Physical Review E 71, 036617 (2005)).

For the metamaterial unit 2 in the embodiment shown in FIG. 4, the refractive index ellipsoid 5 thereof has an ordinary optical axis $n_e$ (briefly called an $n_e$ axis) and an extraordinary optical axis $n_0$ (briefly called an $n_o$ axis), as shown in FIG. 5. Suppose that an origin of coordinates is at a center of the refractive index ellipsoid 5, the $n_o$ axis is the x axis, the $n_e$ axis is the y axis, and any point on the refractive index ellipsoid 5 is represented by $n_x$, $n_y$. Then when the electromagnetic wave as shown in FIG. 7 propagates through the metamaterial unit 2, a wave propagating ellipsoid 50 that corresponds to the refractive index ellipsoid 5 and that is represented by $k_x$, $k_y$ has the following relationships:

$$k_y=n_x\omega/c, k_x=n_y\omega/c \quad (8)$$

where ω represents an angular frequency of the electromagnetic wave, c represents the light velocity, the wave propagating ellipsoid 50 and the refractive index ellipsoid 5 have a common center point, and $k_x$, $k_y$ are coordinates of a point on the wave propagating ellipsoid 50. As can be known from the formula, the wave propagating ellipsoid 50 has a geometry similar to that of the refractive index ellipsoid 5, and a major axis direction thereof corresponds to a minor axis direction of the refractive index ellipsoid 5 while a minor axis direction thereof corresponds to a major axis direction of the refractive index ellipsoid 5.

The deflection direction of the electromagnetic wave after propagating through the metamaterial unit 2 can be depicted by use of the wave propagating ellipsoid 50. As shown in FIG. 5, the electromagnetic wave incident in a direction as shown intersects with a point on the surface of the wave propagating ellipsoid 50 from which the electromagnetic wave is to exit, and a tangent line with respect to the wave propagating ellipsoid 50 is made at this intersection point. A normal direction of the tangent line at the intersection point is an energy propagating direction of the electromagnetic wave. Thus, the electromagnetic wave propagates in this direction within the element. The electromagnetic wave advances in this direction until exiting from the metamaterial. Then the normal line extends to intersect with a surface (i.e., an exit surface) of the metamaterial and continues to exit from the intersection point on the exit surface in a direction parallel to the incident direction. The exit direction is a phase propagating direction of the electromagnetic wave. That is, the anisotropic material can change the energy propagating direction of the electromagnetic wave without changing the phase propagating direction of the electromagnetic wave, and the electromagnetic wave is translated in direction when exiting.

The premise on which the anisotropic material changes the energy propagating direction of the electromagnetic wave without changing the phase propagating direction is that, the material has a uniform refractive index distribution. For a metamaterial that has a non-uniform refractive index distribution and is anisotropic to the electromagnetic wave, both the energy propagating direction and the phase propagating direction of the electromagnetic wave will be changed after the electromagnetic wave passes through such a metamaterial. Hereinbelow, influences of the non-uniform refractive index distribution and the anisotropy on propagation of the electromagnetic wave will be illustrated with reference to three embodiments.

In the metamaterial sheet layers 1 of the three embodiments shown in FIG. 8, FIG. 9 and FIG. 10, the refractive index distributions all have the aforesaid features: the metamaterial units of each column in the y direction have refractive indices of $b_1, b_2, b_3, \ldots, b_q, b_{q+1}, b_{q+2}, \ldots, b_m$ in sequence, and the refractive indices satisfy the relational expressions (1) to (8), with terms in each of the relational expressions (1) to (4) being not equal to each other simultaneously. Therefore, as the refractive index distributions of the three embodiments are identical to each other, the influence of the non-uniformity is the same in the three embodiments; i.e., as shown in FIG. 8 to FIG. 10, for all of the three embodiments, an electromagnetic wave propagating through the first metamaterial section in the same direction and from the same incident site has a deflection angle of β1 when exiting.

The metamaterial units shown in FIG. 8 are all anisotropic, and the corresponding wave propagating ellipsoids 50 are as shown. In this embodiment, the minor axis of each of the wave propagating ellipsoids 50 (i.e., the extraordinary optical axis of the corresponding metamaterial unit 2) is parallel to the z direction (i.e., the incident direction of the electromagnetic wave). Therefore, the energy propagating direction of the incident electromagnetic wave is not changed, and a point to which the electromagnetic wave is converged after exiting from the metamaterial has a distance of f1 from the metamaterial.

For the metamaterial sheet layer 1 shown in FIG. 9, the man-made microstructures 4 of the metamaterial units 2 are all identical to the man-made microstructures 4 of the metamaterial units 2 in the embodiment shown in FIG. 8 in one-to-one correspondence, so the refractive index ellipsoids 5 and the wave propagating ellipsoids 50 are also identical in size and form to those of the embodiment shown in FIG. 8 in one-to-one correspondence. However, each of the man-made microstructures 4 shown in FIG. 9 is rotated clockwise by an angle θ less than 90° with respect to the corresponding man-made microstructure 4 in FIG. 8, so the minor axes of the respective wave propagating ellipsoids 50 are parallel to each other but not parallel to the z direction. The minor axes of the respective wave propagating ellipsoids 50 extend to intersect with the symmetry plane and form an acute angle larger than 0° but smaller than 90° with the symmetry plane.

As can be known from the propagating direction of the electromagnetic wave shown in FIG. 7, the energy propagating direction of the electromagnetic wave within the metamaterial sheet layer 1 will be deflected towards the symmetry plane, which is equivalent to translation of the electromagnetic wave towards the symmetry plane; and due to the variation of the refractive index, the translated electromagnetic wave will be deflected when exiting from the metamaterial sheet layer 1 (i.e., the deflection angle of an electromagnetic wave identical to that shown in FIG. 8 when propagating through the first metamaterial section is β1). In case that the deflection angles are equal to each other, the electromagnetic waves are translated towards the symmetry plane due to the anisotropy in this embodiment, so a point to which two electromagnetic waves identical to that shown in FIG. 8 are converged has a distance f2 from the metamaterial, which is less than the distance f1 of FIG. 8.

For the metamaterial sheet layer 1 shown in FIG. 10, the man-made microstructures 4 of the metamaterial units 2 are all identical to those in the embodiment shown in FIG. 9 in one-to-one correspondence, and the man-made microstructures of the metamaterial units of each row in the z direction are parallel to each other; however, the man-made microstructures 4 of the metamaterial units of each column in the y direction are rotated by an angle with respect to the corresponding man-made microstructures 4 in the embodiment shown in FIG. 9 respectively. As compared to the q man-made microstructures shown in FIG. 9 which have the refractive indices of $b_1, b_2, b_3, \ldots, b_q$ and in which the minor axes of the wave propagating ellipsoids 50 are rotated clockwise by the angle θ with respect to those shown in FIG. 8, the corresponding q man-made microstructures in the embodiment shown in FIG. 10 are rotated clockwise by angles $\theta_1, \theta_2, \theta_3, \ldots, \theta_q$ in sequence, and these rotation angles have the following relationships therebetween:

$$\theta_1 \leq \theta_2 \leq \theta_3 \leq \ldots \leq \theta_q \tag{9}$$

Terms in the relational expression (9) are not equal to each other simultaneously, and $\theta_q$ is such that the minor axis of the wave propagating ellipsoid 50 of the metamaterial unit 2 corresponding to the refractive index $b_q$ is perpendicular to or substantially perpendicular to the z direction (i.e., the extraordinary optical axis of the corresponding refractive index ellipsoid 5 is perpendicular to or approximately perpendicular to the z direction).

As is known from FIG. 9, by clockwise rotating the wave propagating ellipsoids 50 of the anisotropic metamaterial units by the angle θ, the distance between the converging point of the electromagnetic wave and the metamaterial can be reduced. In this embodiment, because the man-made microstructures 4 are further rotated incrementally in sequence, the wave propagating ellipsoids 50 are further clockwise rotated incrementally in sequence in the y direction. Thus, within the metamaterial, the electromagnetic wave will be further deflected towards the symmetry plane each time propagating through one metamaterial unit, and these deflections together increase the equivalent translation amount of the electromagnetic wave when exiting. Therefore, provided that the phase propagating deflection angles $\beta_1$, $\beta_2$ caused by the non-uniform refractive indices remain unchanged, the distance from the converging point of the electromagnetic wave is further reduced to f2. Then, f1, f2 and f3 have the following relationships therebetween:

$$f1 > f2 > f3 \quad (10)$$

As can be seen from this, provided that the refractive index distributions are identical, use of the anisotropic metamaterial units 2 can reduce the distance between the converging point of the electromagnetic waves and the metamaterial (i.e., reduce the focal distance).

In other words, under conditions of identical refractive index distributions and identical focal distances, use of the metamaterial sheet layer 1 (e.g., the embodiments shown in FIG. 9 and FIG. 10) which is anisotropic and in which the extraordinary light optical axes of the refractive index ellipsoids 5 are neither perpendicular nor parallel to the symmetry plane will make the deflection angle of the electromagnetic wave smaller than the deflection angles $\beta_1$, $\beta_2$ in the embodiment shown in FIG. 7. As can be inferred from the relational expression (7), the length d of the metamaterial sheet layer 1 in the z direction is also reduced. In brief, the same converging effect is achieved. For the metamaterial sheet layers 1 shown in FIG. 9 and FIG. 10, the lengths d in the z direction are smaller than that of the metamaterial sheet layer 1 shown in FIG. 8 or the isotropic metamaterial sheet layer 1. This is advantageous in that use of materials is reduced so that the metamaterial product can be made smaller, which is favorable for achieving a lightweight and miniaturized metamaterial product.

Figure 11:
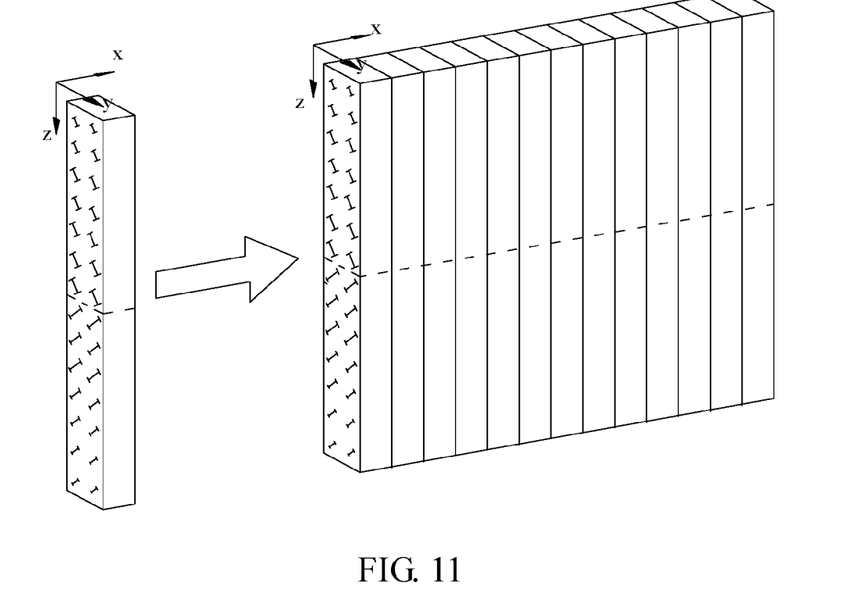
FIG. 11 is a schematic view illustrating stacking of a plurality of metamaterial sheet layers to form a metamaterial for converging electromagnetic waves.

As shown in FIG. 11, the metamaterial for converging electromagnetic waves of the present disclosure is formed by a plurality of metamaterial sheet layers 1 stacked and assembled together in the x direction, so the whole metamaterial may be viewed as being formed by metamaterial units arranged in arrays in planes formed by any two of the x direction, the y direction and the z direction perpendicular to each other. Air or a material whose dielectric constant is close to 1 and which makes no response to the electromagnetic waves is filled among the metamaterial sheet layers 1. When the number of the metamaterial sheet layers 1 is so large that the dimension in the x direction is much larger than the dimension in the z direction, the whole metamaterial may be viewed as a sheet and the dimension in the z direction is the thickness of the sheet. Thus, as can be known from the above conclusion, use of the man-made microstructures 4 which are anisotropic and which can change the energy propagating direction of the electromagnetic waves can reduce the thickness of the overall metamaterial for converging electromagnetic waves, thereby reducing consumption of the materials and achieving a lightweight, thin and miniaturized metamaterial product.

The metamaterial sheet layers 1 constituting the metamaterial may be completely identical to each other. Then, for planar electromagnetic waves, each of the metamaterial sheet layers 1 can converge a column of electromagnetic waves propagating therethrough to a point, so the plurality of metamaterial sheet layers 1 stacked in the x direction can converge the electromagnetic waves into one line parallel to the x direction.

In order to converge the planar electromagnetic waves to a point through the plurality of metamaterial sheet layers 1, the refractive index distribution of the metamaterial in the x direction must also have the same features as that in the y direction. An array formed by the metamaterial units 2 which takes the x direction as a row direction and the y direction as a column direction is called a second array. A sequence formed by the metamaterial units of each row in the second array is a stacked sequence. For the metamaterial units of each row in the second array, the refractive indices thereof also decrease gradually from the middle towards two ends of the row and decrements increase gradually from the middle towards the two ends of the row. Meanwhile, for a row of metamaterial units passing through the middle metamaterial unit, the refractive indices thereof are also $b_1$, $b_2$, $b_3$, ..., $b_q$, $b_{q+1}$, $b_{q+2}$, ..., $b_m$ in sequence, and satisfy the relational expressions (1) to (6).

In order to more intuitively represent the index distribution thus obtained, in the second array formed by the metamaterial units which takes the x direction as a row direction and the y direction as a column direction, the metamaterial units that have the same refractive index are connected to form a line, and the magnitude of the refractive index is represented by the density of the lines. A larger density of the lines represents a larger refractive index. The refractive index distribution of the metamaterial satisfying all of the above relational expressions is as shown in FIG. 12.

Figure 12:
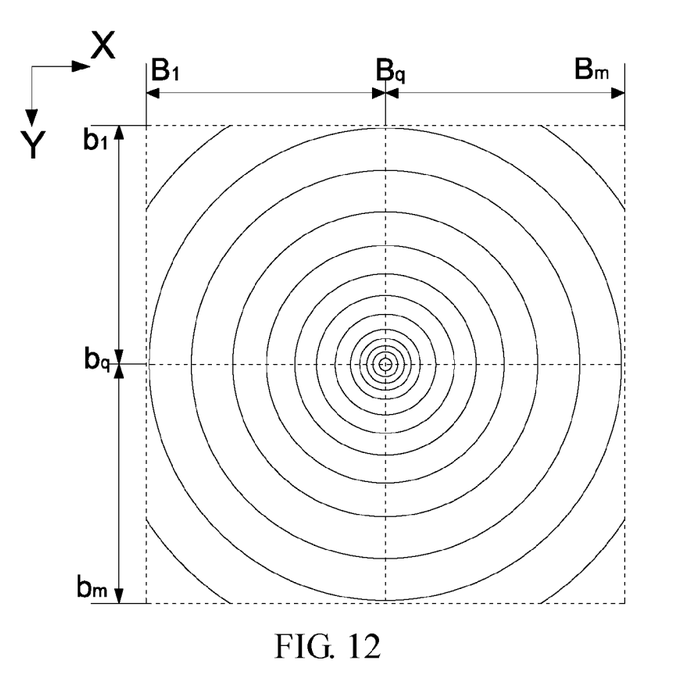
FIG. 12 is a diagram illustrating a refractive index distribution in a plane formed in an x direction and the y direction.

As can be seen from FIG. 12, the refractive indices of the second array are substantially distributed in a circular shape; i.e., with the metamaterial unit located in the $q^{th}$ row and the $q^{th}$ column being taken as a circle center, the refractive indices of the metamaterial units located at positions at identical or similar radii are substantially the same. The metamaterial unit at the circle center has the maximum refractive index, and the refractive indices gradually decrease from the circle center outwards along the radius.

As the refractive index is determined by both the dielectric constant and the magnetic permeability, the refractive index may be adjusted by changing the dielectric constant so as to achieve different refractive index distributions of the electromagnetic waves in the xy plane. By changing the shape and the size of each of the man-made microstructures 4, the dielectric constant of the corresponding metamaterial unit 2 can be changed so as to change the refractive index. For example, by changing the lengths of the first metal wires and the second metal wires of the man-made microstructures 4 shown in FIG. 4, FIG. 6 and FIG. 7, the dielectric constants of the corresponding metamaterial units 2 can be changed.

For the man-made microstructures 4 having the same geometry, the refractive indices of the corresponding metamaterial units 2 increase as sizes of the man-made microstructures 4 increase. As the refractive indices remain unchanged in the z direction, the man-made microstructures 4 of the metamaterial units of each row in the z direction may be designed to be completely identical to each other.

According to the above descriptions, the metamaterial of the present disclosure has the following features.

1) The refractive index distribution in the xy plane is as shown in FIG. 12. The refractive indices in the z direction remain unchanged, so converging of electromagnetic waves can be achieved. The thickness in the z direction can be made to be very thin and, in practice, as thin as about 2 mm~3 mm.

2) The man-made microstructures 4 on each of the metamaterial sheet layers 1 are designed to be anisotropic, and the refractive index ellipsoids 5 thereof are neither perpendicular nor parallel to the z direction. This can deflect the energy propagating direction of the electromagnetic waves towards the middle within the metamaterial so as to reduce the focal distance of the electromagnetic waves when exiting, thereby narrowing the propagating scope. In other words, the same converging effect is achieved, and use of the anisotropic man-made microstructures 4 allows the metamaterial product to be made thinner.

3) The man-made microstructures 4 in the y direction are rotated in sequence, and this can further increase the translation amounts of the electromagnetic waves within the metamaterial so as to reduce the focal distance or similarly reduce the thickness d of the metamaterial product.

Accordingly, the embodiments of the present disclosure have been described above with reference to the attached drawings; however, the present disclosure is not limited to the aforesaid embodiments, and these embodiments are only illustrative but are not intended to limit the present disclosure. Those of ordinary skill in the art may further devise many other implementations according to the teachings of the present disclosure without departing from the spirits and the scope claimed in the claims of the present disclosure, and all of the implementations shall fall within the scope of the present disclosure.

What is claimed is:

1. A metamaterial for converging electromagnetic waves is consisted of a plurality of cubic metamaterial units arranged in a first array which takes a y direction as a column direction and a z direction perpendicular to the y direction as a row direction, wherein the metamaterial units of each row have the same refractive index, and for the metamaterial units of each column, the refractive indices thereof for the electromagnetic waves decrease gradually from a middle metamaterial unit towards two ends of the column, with variations of the refractive indices between adjacent ones of the metamaterial units increasing gradually from the middle metamaterial unit towards the two ends of the column; and the metamaterial units are anisotropic to the electromagnetic waves;

wherein each of the metamaterial units comprises a cubic substrate unit and a man-made microstructure disposed in the substrate unit, the substrate unit of each of the metamaterial units is same, and the man-made microstructure of each of the metamaterial unit is a non-90° rotationally symmetrical structure;

for each row of the metamaterial units, man-made microstructures of the metamaterial units in a same row are same in size; and for each column of the metamaterial units, man-made microstructures of the metamaterial units in a same column are decreased gradually in size from the middle metamaterial unit towards two ends of the same column;

each of the man-made microstructures of the metamaterial units is rotated by a angle no more than 90° and larger than 0° with respect to the z direction, so as to reduce a focal distance of the metamaterial, wherein for each row of the metamaterial units, the man-made microstructures of the metamaterial units in a same row are rotated by a same angle with respect to the z direction, and the same angle is no more than 90° and larger than 0°; and for each column of the metamaterial units, each of the man-made microstructures of the metamaterial units in a same column is rotated by an angle with respect to the z direction, the angle is no more than 90° and larger than 0°, and the angle is decreased gradually from the middle metamaterial unit towards two ends of the same column.

2. The metamaterial for converging electromagnetic waves of claim 1, wherein the metamaterial units all have the same volume.

3. The metamaterial for converging electromagnetic waves of claim 1, wherein the refractive indices of the metamaterial units of each column are $b_1, b_2, b_3, \ldots, b_q, b_{q+1}, b_{q+2}, \ldots, b_m$ in sequence, where q is a natural number greater than 1, m is a natural number greater than 2, the metamaterial unit that has the refractive index $b_q$ is the middle metamaterial unit, and the refractive indices satisfy:

$$(b_2-b_1) \geq (b_3-b_2) \ldots \geq (b_{q-1}-b_q);$$

$$(b_{q+1}-b_{q+2}) \leq (b_{q+2}-b_{q+3}) \ldots \leq (b_{m-1}-b_m).$$

4. The metamaterial for converging electromagnetic waves of claim 3, wherein the refractive indices of each column of the metamaterial units are distributed in symmetry as follows:

when m is an odd number, the refractive indices satisfy $q=(m+1)/2$, $b_1=b_m$, $b_2=b_{m-1}, \ldots, b_{q-1}=b_{q+1}$; and when m is an even number, the refractive indices satisfy $q=m/2$, $b_1=b_m$, $b2=b_{m-1}, \ldots, b_q=b_{q+1}$.

5. The metamaterial for converging electromagnetic waves of claim 1, wherein each of the metamaterial units comprises a cubic substrate unit and a man-made microstructure disposed in the substrate unit, and the substrate unit is the same for each of the metamaterial units.

6. The metamaterial for converging electromagnetic waves of claim 5, wherein the metamaterial units of each row have the same man-made microstructures and thus have the same refractive indices; and for each column of the metamaterial units, the man-made microstructures thereof decrease gradually from the middle metamaterial unit towards two ends of the column so that the refractive indices of the metamaterial units decrease gradually.

7. The metamaterial for converging electromagnetic waves of claim 5, wherein dimensions of each of the metamaterial units in an x direction, the y direction and the z direction range between one fiftieth and a half of the wavelength of the electromagnetic waves.

8. The metamaterial for converging electromagnetic waves of claim 5, wherein the man-made microstructures of the metamaterial units are non-90° rotationally symmetrical structures, so the metamaterial units are anisotropic to the electromagnetic waves.

9. The metamaterial for converging electromagnetic waves of claim 8, wherein the man-made microstructures of each column in the y direction are rotated clockwise or counterclockwise in sequence respectively from the middle metamaterial unit towards two ends of the column, and the man-made microstructures of the metamaterial units located at the two ends are rotated by no more than 90° with respect to the man-made microstructure of the middle metamaterial unit.

10. The metamaterial for converging electromagnetic waves of claim 9, wherein clockwise rotation angles of the man-made microstructures of each column in the y direction are $\theta_1, \theta_2, \theta_3, \ldots, \theta_q$ in sequence, and have the following relationships therebetween:

$$\theta_1 \leq \theta_2 \leq \theta_3 \leq \ldots \leq \theta_q.$$

11. The metamaterial for converging electromagnetic waves of claim 5, wherein each of the man-made microstructures is a metal wire of an "I" shape, a metal wire of a two-dimensional (2D) snowflake shape or a metal wire of a three-dimensional (3D) snowflake shape.

12. The metamaterial for converging electromagnetic waves of claim 1, comprising a plurality of metamaterial units arranged in arrays in planes formed by any two of the x direction, the y direction and the z direction perpendicular to each other.

13. The metamaterial for converging electromagnetic waves of claim 12, wherein the metamaterial units of each stacked sequence arranged in the x direction have equal refractive indices.

14. The metamaterial for converging electromagnetic waves of claim 12, wherein for the metamaterial units of each stacked sequence arranged in the x direction, the refractive indices thereof also decrease gradually from another middle metamaterial unit towards two ends of the stacked sequence and variations of the refractive indices between adjacent ones of the metamaterial units increase gradually from the another middle metamaterial unit towards the two ends of the stacked sequence.

15. The metamaterial for converging electromagnetic waves of claim 12, wherein a second array is formed by taking the x direction as a row direction and the y direction perpendicular to the x direction as a column direction, and the refractive indices of the second array are distributed in a circular shape.

16. The metamaterial of converging electromagnetic wave of claim 1, wherein the metamaterial is divided into a first metamaterial section and a second metamaterial section by a symmetry plane, a first incline direction of the man-made microstructures of the metamaterial units in the first metamaterial section is opposite to a second incline direction of the man-made microstructures of the metamaterial units in the second metamaterial section.

\* \* \* \* \*